June 21, 1938. F. T. ROBINSON 2,121,053
LINING FOR CONTAINERS AND MACHINE FOR AND METHOD OF FORMING THE SAME
Original Filed Jan. 30, 1932 6 Sheets-Sheet 1

INVENTOR
FRANCIS T. ROBINSON
BY his ATTORNEYS

June 21, 1938.  F. T. ROBINSON  2,121,053
LINING FOR CONTAINERS AND MACHINE FOR AND METHOD OF FORMING THE SAME
Original Filed Jan. 30, 1932   6 Sheets-Sheet 3

INVENTOR
FRANCIS T. ROBINSON.
BY ATTORNEY S

June 21, 1938. F. T. ROBINSON 2,121,053

LINING FOR CONTAINERS AND MACHINE FOR AND METHOD OF FORMING THE SAME

Original Filed Jan. 30, 1932 6 Sheets-Sheet 4

INVENTOR
FRANCIS T. ROBINSON.
BY his ATTORNEYS

June 21, 1938.  F. T. ROBINSON  2,121,053

LINING FOR CONTAINERS AND MACHINE FOR AND METHOD OF FORMING THE SAME

Original Filed Jan. 30, 1932   6 Sheets-Sheet 5

INVENTOR
FRANCIS T. ROBINSON.
BY his ATTORNEYS

June 21, 1938. F. T. ROBINSON 2,121,053
LINING FOR CONTAINERS AND MACHINE FOR AND METHOD OF FORMING THE SAME
Original Filed Jan. 30, 1932 6 Sheets-Sheet 6

INVENTOR
FRANCIS T. ROBINSON
BY his ATTORNEYS

Patented June 21, 1938

2,121,053

UNITED STATES PATENT OFFICE 2,121,053

LINING FOR CONTAINERS AND MACHINE FOR AND METHOD OF FORMING THE SAME

Francis T. Robinson, Rockville Centre, N. Y., assignor to Arkell Safety Bag Company, New York, N. Y., a corporation of New York Application January 30, 1932, Serial No. 589,831
Renewed September 16, 1937

8 Claims. (Cl. 93—20)

In the manufacture of crinkled paper linings for bags, barrels and other containers, it has been customary to close the edges of the lining blank by means of sewed seams. Considerable difficulty, however, has been experienced with such linings owing to the weakness of the seams, the crinkled paper easily tearing along the line of stitching. Also, where the contents of the bag is of finely divided material, it is likely to sift through the needle holes, and in cases where the crinkled paper is waterproofed to protect the contents from dampness, it is necessary to subject the sewed seams to a coating of paraffin in order to fill up the needle holes. Owing to the nature of crinkled paper, it was not thought practicable to make a pasted or glued seam.

One of the objects of the present invention is to provide a method of and machine for closing the edges of a lining blank of crinkled paper by means of a pasted or glued seam in such a manner as to overcome the disadvantages above described of the sewed seam, while retaining all of the advantages.

Another of the objects of the invention is to provide a method of the character indicated which may be carried out inexpensively and expeditiously.

Another object of the invention is to provide a novel and improved bag lining or similar article of crinkled paper.

The several features of the invention, whereby the above-mentioned and other objects may be attained, will be readily understood from the following description and accompanying drawings, in which.

Figure 1:
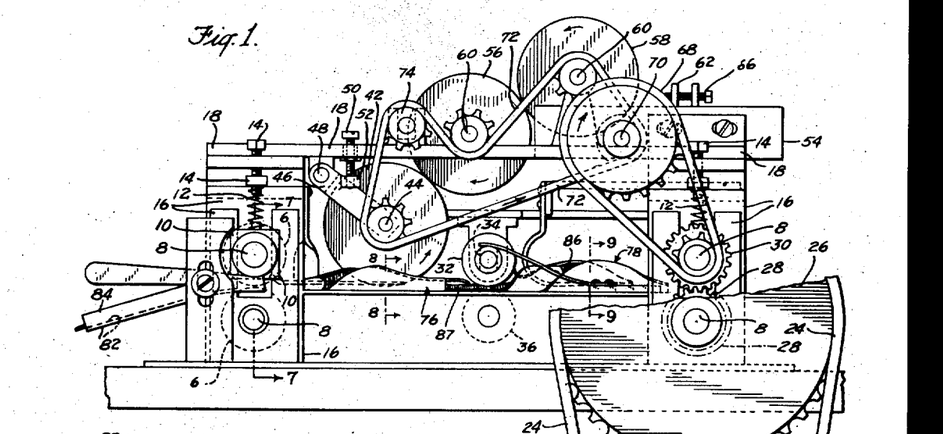
Fig. 1 is a side view of a portion of the machine in its preferred form.
Figure 2:
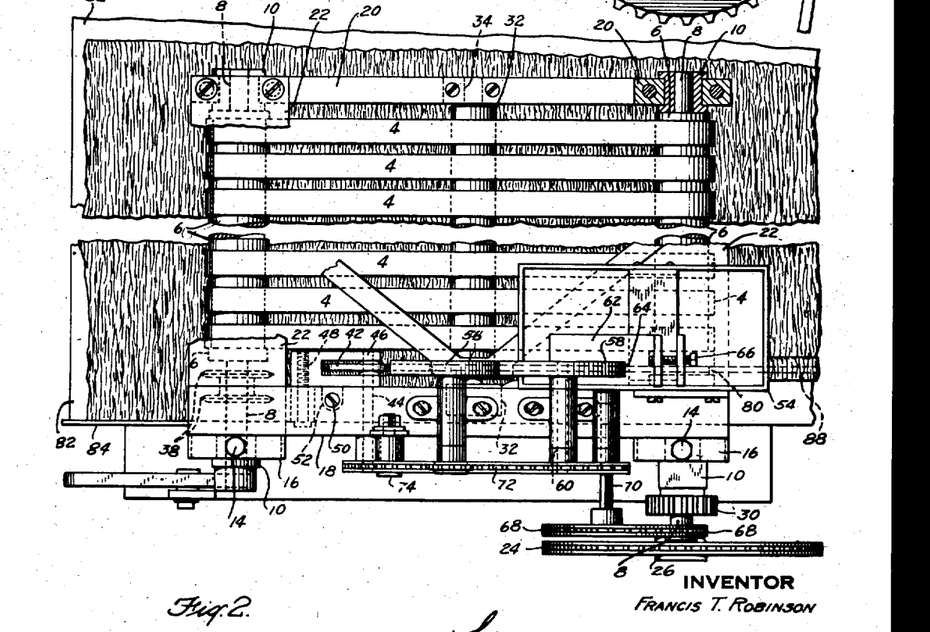
Fig. 2 is a plan view of the same.
Figure 3:
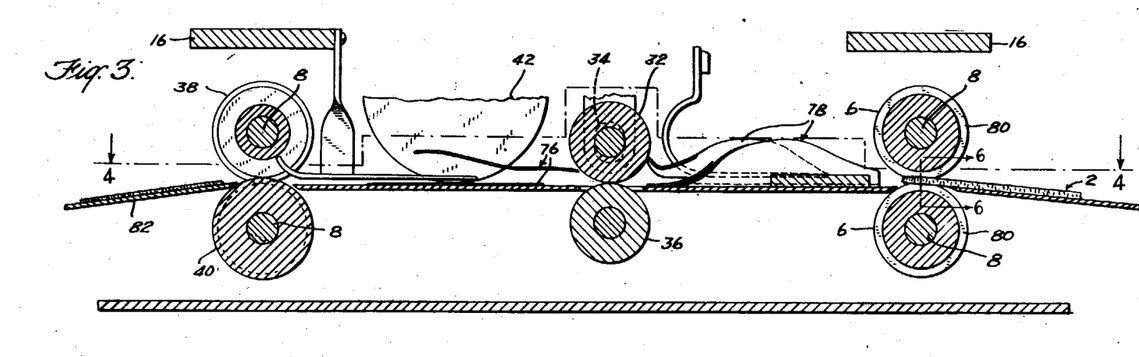
Fig. 3 is a longitudinal sectional view, partly diagrammatical, of a portion of the machine.
Figure 4:
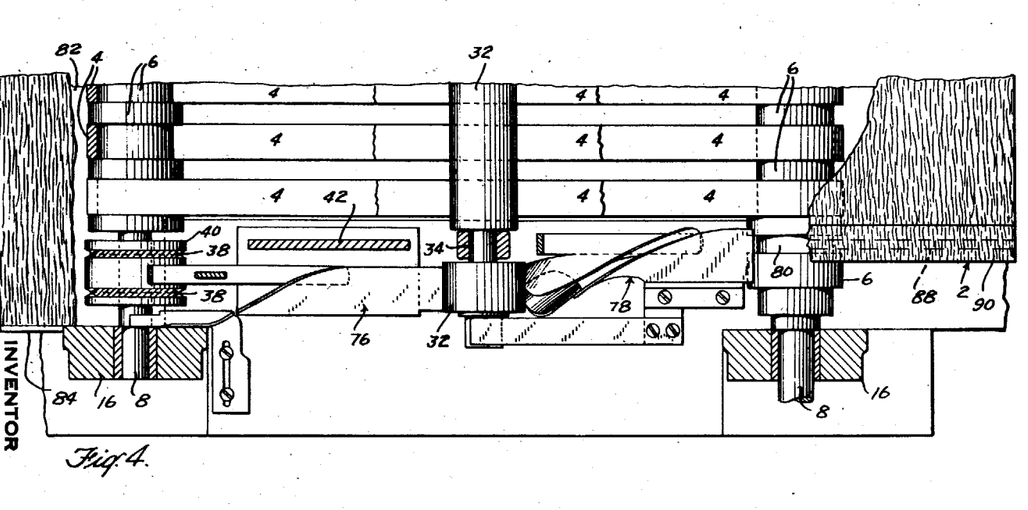
Fig. 4 is a sectional plan view taken on the line 4—4 of Fig. 3.
Figure 12:
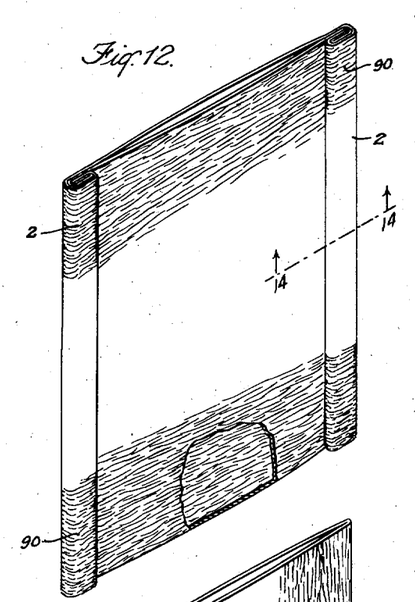
Fig. 12 is a view in perspective of a crinkled paper lining having its seams formed in accordance with my improved method, the seams being shown greatly enlarged for the sake of clearness.
Figure 13:
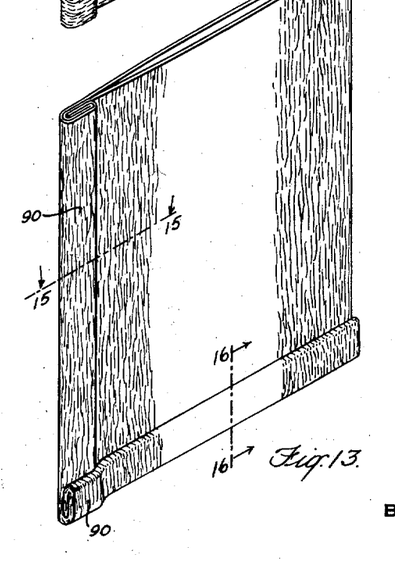
Fig. 13 is another form of the lining.
Figure 14:
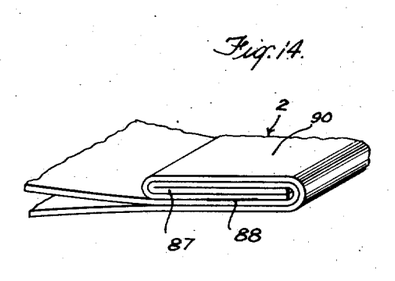
Fig. 14 is a detail sectional perspective view, taken on the line 14—14 of Fig. 12, more clearly illustrating the form of seam used.

The machine illustrated in Figs. 1 and 2 of the drawings is particularly adapted for forming the seams 2 of the crinkled paper bag lining illustrated in Figs. 12 and 14. As shown, this lining is made of a single strip of crinkled paper, having the crinkles extending generally transversely thereof, which is folded over upon itself and its longitudinal edges closed by my improved seam.

As shown, the machine is provided with a series of upper and lower feed belts 4 which pass over pulleys or rolls 6 that are secured on shafts 8, the stretches of the two series of belts being arranged horizontally one above the other. The lower shafts 8 have their ends suitably journaled in bearings in the frame of the machine. The shafts 8 of the upper pulleys or rolls 6 have their ends journaled in bearing blocks 10 which are mounted to slide vertically in suitable guideways in the machine frame so as to cause the upper belts by gravity to be pressed downwardly towards the lower belts. To still further press the two series of belts toward each other, the bearing blocks 10 at one side of the machine are pressed downwardly by means of coiled springs 12 interposed between the upper ends of the blocks and adjusting screws or bolts 14. The guideways for the bearing blocks 10 at said side of the machine are formed in posts 16 which are connected at their upper ends by means of a bar 18. The guide-ways for the bearing blocks 10 for the inner ends of the upper shafts 8, are formed in a frame member 20 which is secured to the upper side of the inner ends of transverse supporting bars 22 that have their forward ends secured to the upper ends of the posts 16. The upper and lower shafts 8 at the rear of the machine are driven from a suitable source of power through a sprocket chain 24 which operatively engages a sprocket wheel 26 secured on the outer end of the lower shaft 8. This shaft 8 carries a gear 28 which engages a gear 30 on the outer end of the upper shaft 8 so as to cause the two shafts to be driven together in opposite directions and thus drive feed belts 4, the adjacent stretches of the upper and lower series of feed belts being driven in the same direction. A pressure roll 32 bears on the lower stretches of the upper belts intermediate their ends, this roll having its ends mounted to turn in slots 34 in the machine frame. A roll 36 is positioned directly below the roll 32 and is arranged to engage the upper stretches of the lower belts 4, the ends of this roll 36 being journaled in fixed bearings in the machine frame.

The forward one of the upper shafts 8 carries at its outer end portion, scoring disks 38 having beveled edges which are received in correspondingly beveled grooves in a roll 40 carried by the corresponding lower shaft 8.

As the material is fed through the machine a line of glue is applied thereto by means of a disk wheel 42 which is mounted to turn on a shaft 44 on the end of a bracket arm 46 that is pivoted at 48 on the beam 18 of the machine frame. The arm 46 is held in position to properly position the glue wheel 42, by means of an adjusting screw 50 which has its ends screw-threaded into a lug 52 on the bracket arm 46. Glue is applied to the glue wheel 42 from a glue pan 54 through similar disk wheels 56 and 58 which are secured on shafts 60 suitably journaled in bearings on the machine frame, the lower portion of the wheel 58 extending into the liquid glue in the glue pan.

A scraper blade 62, which is bifurcated, straddles the glue wheel 58. This scraper blade scrapes the glue taken up by the wheel from the sides thereof, and the distance the wall 64 of this bifurcated portion is spaced from the periphery of the wheel determines the thickness of the glue taken up by the wheel. To vary the amount of glue thus taken up by the periphery of the wheel, the blade 62 is adjustable by adjusting a screw 66 which is screw-threaded into the rear end of the blade.

The glue from this wheel 64 is deposited on the periphery of the wheel 56 and from there it is deposited on the periphery of the wheel 42, which in turn delivers the glue to the work. Relatively heavy or thick glue is employed, and the wheel 42 deposits a thick or gob-like line of glue on the work. To vary the thickness of the line of glue, this may be done by adjustment of the glue wheel 42 toward and from the work by means of the adjusting screw 50 as above described, and by adjustment of the glue wheel 56 toward and from the periphery of the wheel 42 and the wheel 58 toward and from the periphery of the wheel 56, the bearings for the wheels 56 and 58 being adjustable fore and aft of the machine as shown, and the amount of glue being supplied to the periphery of the wheel 58 being adapted to be varied by adjustment of the scraper blade 62 as above described. The three glue wheels 42, 56 and 58 are driven from the upper one of the rear shafts 8 through a sprocket chain 68 which passes over sprocket wheels on said shaft 8 and a short shaft 70, and a sprocket chain 72 which passes over a sprocket wheel on the shaft 70 and sprocket wheels on the shafts of said glue wheels, an idler sprocket wheel 74 being interposed between the sprocket wheels and shafts of the glue rolls 42 and 56.

The machine is further provided with a suitable folding device 76 at the rear of the scoring disks 38, and with a suitable folding device 78 between the rolls 32—36 and the rear belt rolls or pulleys 6. The outer end portions of the rear rolls 6 are provided with registering annular grooves 80.

Figures 5, 6, 7, 8, 9:
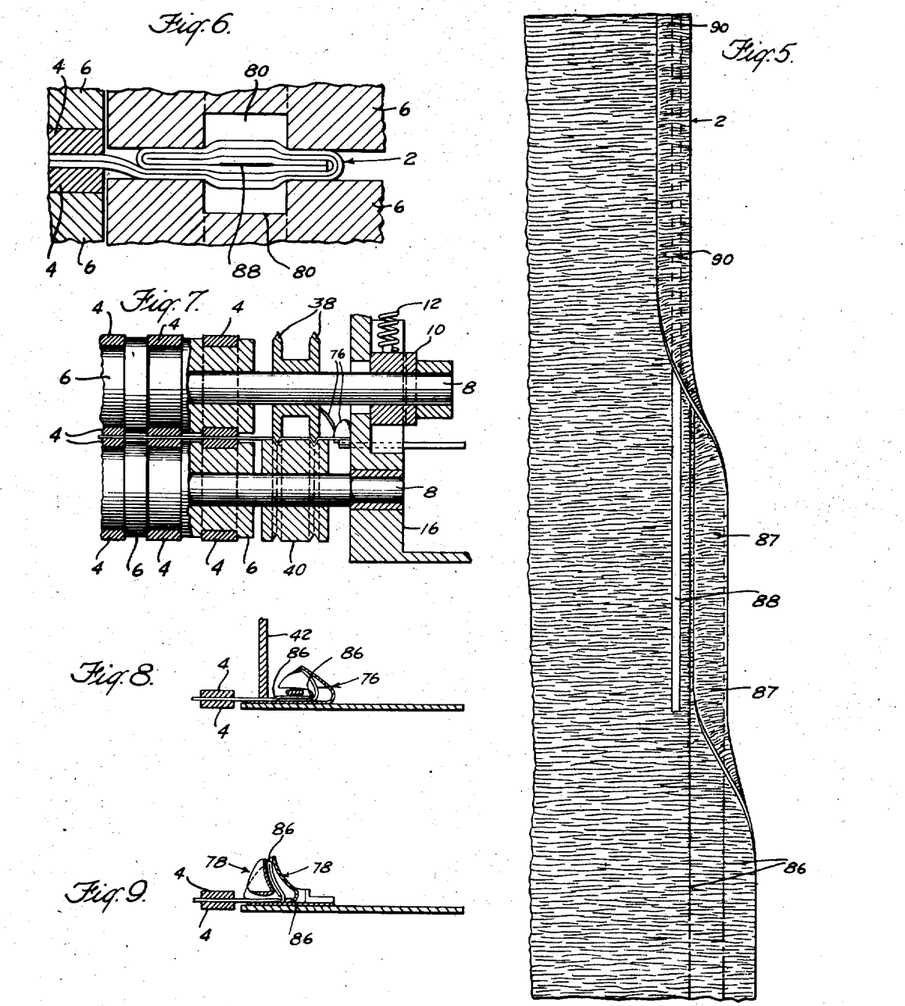
Fig. 5 is a plan view of a crinkled paper lining blank showing the different steps in the formation of the same.
Fig. 6 is a detail sectional view, on an enlarged scale, taken on the line 6—6 of Fig. 3.
Fig. 7 is a detail sectional view, partly in elevation, taken on the line 7—7 of Fig. 1.
Figs. 8 and 9 are detail sectional views taken respectively on the lines 8—8 and 9—9 of Fig. 1.

In forming the seams 2 of the bag lining shown in Figs. 5, 12 and 14, the folded blank is fed over an inclined table 82 with said edge against a guiding flange 84 on the table. The end of the blank is thus presented between the upper and lower feed belts 4, the marginal portion of the blank passing between the scoring rolls 38 and 40. The feed belts 4 serve to feed the blank through the machine. As the blank passes between the scoring rolls 38 and 40, these rolls form two lines 86 of scoring (Fig. 5) which are spaced apart and spaced from the longitudinal edge of the blank as shown. The advancing end of the blank after leaving the scoring rolls enters the folding device 76 and as it passes therethrough, the two walls or sheets of the blank are folded on the outer one of the lines of scoring 86 so as to form the fold 87. As this fold is being made in the blank, the blank passes beneath the glue roll 42 which deposits a gob-like line of glue 88 on the blank, the line of glue being spaced a distance inwardly from the inner line of scoring 86.

The blank after leaving this folding device 76 passes between the pressure rolls 32—36 and the outer end portions of these rolls firmly press down and flatten the fold 87. After traveling beneath these pressure rolls and leaving the glue roll 42, the blank passes through the folding device 78 which is suitably formed so as to make a second fold 90 in the blank on the inner line of scoring 86. This last folding operation, positions the double folded marginal portion over the line of glue 88, the line of glue being more or less centrally positioned between the longitudinal edges of the folded portion.

As the blank passes between the rear belt rolls 6, the outer end portion thereof applies a rolling pressure on the seam at opposite sides of the line of glue 88 so as to tightly and firmly press the double fold at its edges and into contact with the gob of glue. The registering annular grooves 80 in the rolls 6, insures pressure being applied at the edge portions of the folds without the application of pressure over the line of glue.

After thus forming the seam at one of the longitudinal edges of the bag blank as above described, the blank may be turned over or around and again run through the machine so as to form a similar seam at the other longitudinal edge of the blank. If desired, both of the longitudinal edges of the bag blank may be simultaneously closed by merely duplicating the parts of the machine, or employing two machines arranged in proper alinement to act simultaneously on the two edges.

When the bag blank has thus been run through the machine and seams formed at both of its longitudinal edges, the blank while the glue is still in a more or less tacky condition may be stacked in a baling press and baled for shipment. The baling press tends to flatten out the seams, but before application of this pressure, the glue should be sufficiently dry to ensure against it being squeezed out from between the folds.

By forming pasted or glued seams by my improved machine and in accordance with the method above described, it has been found that the glue securely holds the glued portion of the seam so that the seam is of adequate strength for the purposes intended. By applying a thick gob-like line of glue between the folds which are to be glued together, and by applying pressure at opposite sides of the line of glue, immediately after the parts are brought together, without applying pressure over the line of glue, the glue is effectively retained within the folds and during the pressing operation will not be squeezed out between the folds but will be retained between the folds so as to be properly utilized for securing purposes. The glue fills up the crinkles in the paper and owing to the increased surface provided by the crinkles, it firmly secures the folds together, and an exceptionally strong seam is provided.

Where the bag blank is coated with paraffin or other waterproofing material, a suitable solvent for such material should be used in the glue, so as to ensure the glue coming in contact with the fibers of the paper.

Figures 10, 11:
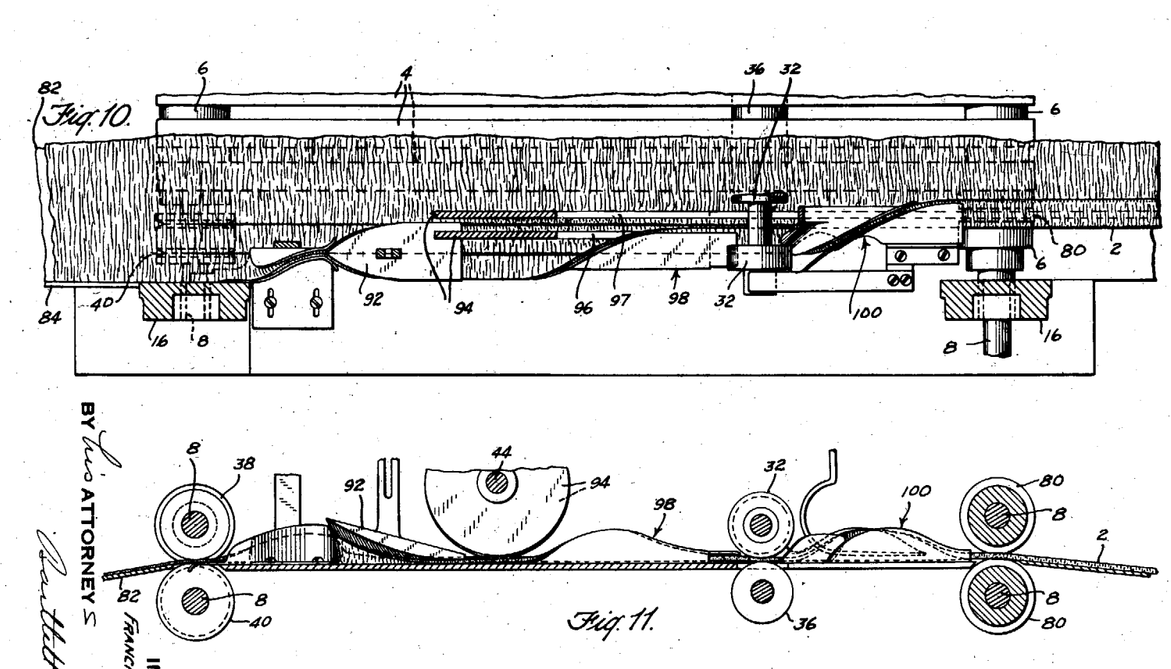
Fig. 10 is a sectional plan view, partly diagrammatical, of a slightly modified form of the machine.
Fig. 11 is a longitudinal sectional view of the same, similar to Fig. 3.
Figure 16:
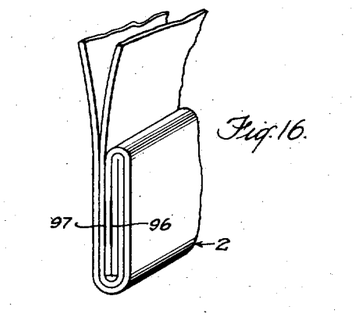

In forming the seam shown in Fig. 16 of the drawings, the machine may be adjusted or modified as shown in Figs. 10 and 11. As the bag blank is fed through this form of the machine and as the blank leaves the scoring rolls, the marginal portions of the two sheets are spread apart by means of a suitably formed spreading and folding device 92. This device then folds back the marginal portion of the uppermost sheet, and the marginal portion of the other sheet is brought down in the plane of the remaining portion of said sheet. As the blank leaves the spreading and folding device 92, one of two blue rolls or wheels 94 applies a line of glue 96 to the top side of the folded marginal portion of the upper sheet, and the other wheel 94 applies a line of glue to the body of the upper sheet on a line spaced a distance inwardly from the inner edge of said marginal portion of the upper sheet. The projecting marginal portion of the lower sheet is then folded over on the outer line of scoring so as to lie over the outer line of glue 96, by means of a suitable folding device 98. After the blank leaves this folding device 98, it passes through a second folding device 100 which folds the marginal portion of the two blanks on the second line of scoring over upon the inner line of glue. The double folds thus made are then pressed together by the grooved portions 80 of the rear rollers 6 of the machine to complete the fold. By thus forming the fold it may be noted that owing to the two lines of adhesive the seam is of exceptional strength.

In some cases it may be desirable to have the inner line of glue 97 secure the folds together less securely than the other line of glue 96 so that in filling the lining the line of glue 97 may give and thus allow for undue strain applied to the lining, the seam then being securely held by the line of glue 96.

Figure 15:
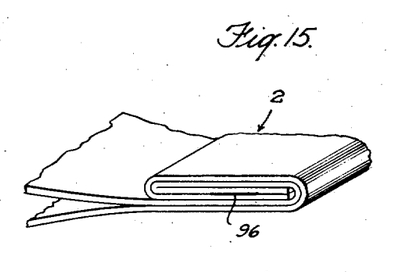
Figs. 15 and 16 are similar views taken on the lines 15—15 and 16—16 of Fig. 13.

In some instances, also, the second line of glue 97 may be entirely omitted as shown in Fig. 15, in which case the line of glue 96 alone may be employed, the folds being made in the same way as shown in Fig. 16. In this case, the second fold formed in the lining is free to open up to provide slack in filling the lining, and thus allow the lining to conform to the wall of the bag or other container in which the lining is used.

The seam shown in Fig. 15 is particularly adapted for the longitudinal edges of the blank, while the seam 16 is well adapted for the bottom end of the blank.

Figure 17:
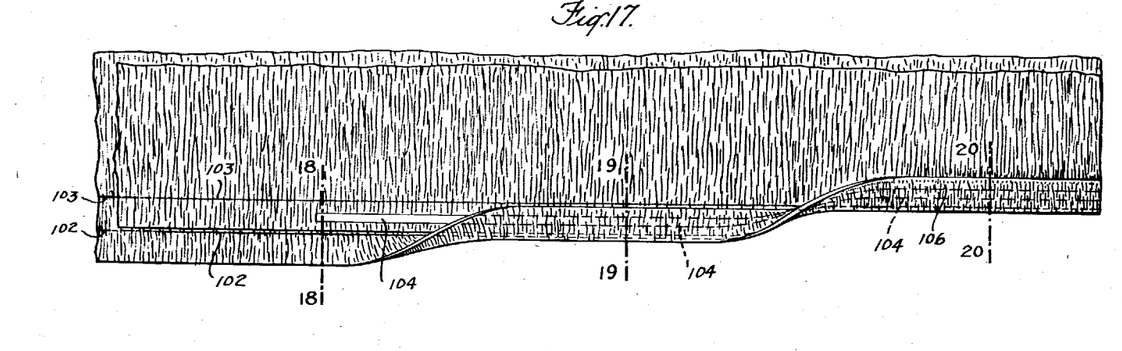
Fig. 17 is a view corresponding to Fig. 5, but showing a slightly different form of seam.
Figure 18:
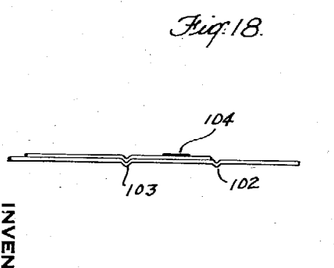
Figs. 18, 19 and 20 are detail sectional views, partly diagrammatical, respectively taken substantially on the lines 18—18, 19—19 and 20—20 of Fig. 17.
Figure 19:
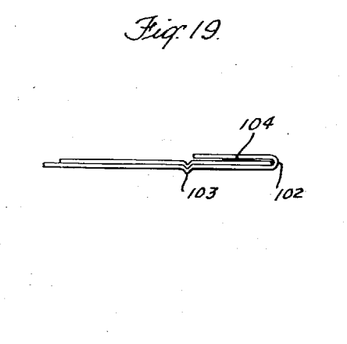

In forming the seam shown in Fig. 17, the two walls or sheets of the bag blank are fed through the machine in superposed relation but with the longitudinal edge of the upper sheet spaced a distance inwardly from the longitudinal edge of the other wall. The blank as it is fed through the machine may be scored on lines 102 and 103, the line 102 being made in the lower sheet adjacent the outer edge of the upper sheet and the line 103 being spaced a distance inwardly from the longitudinal edge of the upper sheet. As the blank is fed through the machine, a line of glue 104 is applied to the upper blank parallel midway between its longitudinal edge and the line of scoring 103. The projecting marginal portion of the lower blank is then folded over on the line 102 so as to position it over the adhesive 104. If desired a second fold 106 may be made in the blank on the line 103.

Figure 20:
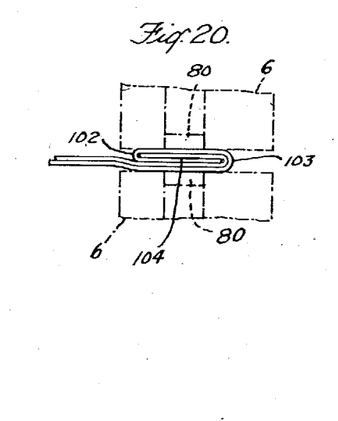

As the blank is passed between the grooved portions of the rollers 6, as shown in Fig. 20, the seam is completed. This seam has been found to be of great strength and there is a substantial saving of material.

It has been found that in closing the seams, if pressure were applied to the folds over the freshly applied lines of glue, the glue would squeeze out between the crinkles and would not securely hold. By applying the pressure, however, by means of rollers having the grooves 80, the pressure is concentrated at opposite sides of the line of glue so that none of the glue is squeezed out between the folds. The gob-like line of glue fills up the roughened surface provided by the crinkles and when dried firmly secures the surfaces together.

As will be evident to those skilled in the art, my invention permits various modifications without departing from the spirit thereof or the scope of the appended claims.

What I claim is:

1. The method of forming a seam for closing one of the edges of a bag of crinkled paper of the class described which comprises feeding the bag blank longitudinally with relation to said edge, scoring the blank on spaced lines parallel to and spaced from said edge, applying adhesive to one side of said blank on a line parallel with said edge and spaced a distance inwardly from the inner line of scoring, folding said blank on the outer line of scoring and then on the inner line so as to form a double fold extending over said line of adhesive, and pressing said double fold upon said line of adhesive by pressure applied at opposite sides of said line of adhesive, said line of adhesive being of gob-like form.

2. The method of forming a seam for closing one of the edges of a bag of crinkled paper of the class described, which comprises folding said edge over upon itself on a line parallel therewith, applying adhesive to the side of the bag blank on which the fold is made on a line parallel to said edge and spaced inwardly from said fold, again folding said edge to make a double fold extending over said line of adhesive, and pressing said double fold upon said line of adhesive by pressure applied at opposite sides of said line of adhesive, said line of adhesive being of gob-like form.

3. The method of forming a seam for closing one of the edges of a bag of crinkled paper of the class described, which comprises feeding the bag blank longitudinally with relation to said edge, folding back the marginal portion of one wall of the bag blank, applying two lines of adhesive, one to said marginal portion and the other spaced a distance inwardly from the edge of said marginal portion, folding the outer marginal portion over upon the folded back marginal portion and the line of adhesive thereon, and then folding the two marginal portions over on to the other line of adhesive, said lines of adhesive when the blank is thus folded being arranged one over the other, and thereafter applying pressure to said folded over portions on lines parallel with and at opposite sides of said lines of adhesive.

4. A bag lining made of crinkled paper with the crinkles extending generally transversely thereof, and with at least one of the longitudinal edges of its walls closed by a seam comprising marginal portions of the two walls secured together by a line of adhesive parallel with the longitudinal edges, and with said marginal portions folded over to provide slack in opening up the bag lining.

5. In a machine for securing the edges of two sheet portions of crinkled paper together, the combination of means for feeding the sheets in superposed relation longitudinally with relation to said edges, means for scoring the sheets on spaced lines parallel to and spaced from said edges, means for applying a gob-like line of adhesive to the outer side of one of the sheets on a line parallel with its edge and spaced a distance inwardly from the inner line of scoring, means for folding both sheets on the outer line of scoring and then on the inner line so as to form a double fold extending over said line of adhesive, and means for pressing said double fold upon said line of adhesive by pressure applied at opposite sides of said line of adhesive.

6. In a machine for securing the edges of two sheet portions of crinkled paper together, the combination of means for folding corresponding marginal portions of said sheets on a line parallel with said edges, means for applying a gob-like line of adhesive to the outer side of the sheet on which the fold occurs on a line parallel to its edge and spaced inwardly from said fold, means for again folding said marginal portions to make a double fold extending over said line of adhesive, and means for pressing said double fold upon said line of adhesive by pressure applied at opposite sides of said line of adhesive.

7. The method of securing the marginal portions of two sheet portions of crinkled paper together which comprises applying a gob-like line of adhesive to the marginal portion of one of the sheets on a line parallel with its edges, arranging the marginal portions of the two sheets together in superposed relation with the line of adhesive between them, applying pressure to said marginal portions at opposite sides of said line of adhesive so as to cause the adhesive to be squeezed into the spaces between the portions of the crinkles that extend between the lines of pressure while preventing it from spreading beyond said lines, and after the adhesive has become partially dried so that it is in a non-flowing but soft and tacky condition, applying pressure to the seam over said line of adhesive.

8. A bag lining made of crinkled paper with the crinkles extending generally transversely thereof and with at least one of the longitudinal edges of its walls closed by a seam comprising marginal portions of the two walls secured together by a line of adhesive parallel with the longitudinal edges, said lining having longitudinally extending means to provide for circumferential stretchability.

FRANCIS T. ROBINSON.

---

CERTIFICATE OF CORRECTION.

Patent No. 2,121,053.   June 21, 1938.

FRANCIS T. ROBINSON.

It is hereby certified that error appears in the printed specification of the above numbered patent requiring correction as follows: Page 1, second column, line 51, for the word "upper" read under; and that the said Letters Patent should be read with this correction therein that the same may conform to the record of the case in the Patent Office.

Signed and sealed this 26th day of July, A.D. 1938.

(Seal)

Henry Van Arsdale,
Acting Commissioner of Patents.

spaced a distance inwardly from the edge of said marginal portion, folding the outer marginal portion over upon the folded back marginal portion and the line of adhesive thereon, and then folding the two marginal portions over on to the other line of adhesive, said lines of adhesive when the blank is thus folded being arranged one over the other, and thereafter applying pressure to said folded over portions on lines parallel with and at opposite sides of said lines of adhesive.

4. A bag lining made of crinkled paper with the crinkles extending generally transversely thereof, and with at least one of the longitudinal edges of its walls closed by a seam comprising marginal portions of the two walls secured together by a line of adhesive parallel with the longitudinal edges, and with said marginal portions folded over to provide slack in opening up the bag lining.

5. In a machine for securing the edges of two sheet portions of crinkled paper together, the combination of means for feeding the sheets in superposed relation longitudinally with relation to said edges, means for scoring the sheets on spaced lines parallel to and spaced from said edges, means for applying a gob-like line of adhesive to the outer side of one of the sheets on a line parallel with its edge and spaced a distance inwardly from the inner line of scoring, means for folding both sheets on the outer line of scoring and then on the inner line so as to form a double fold extending over said line of adhesive, and means for pressing said double fold upon said line of adhesive by pressure applied at opposite sides of said line of adhesive.

6. In a machine for securing the edges of two sheet portions of crinkled paper together, the combination of means for folding corresponding marginal portions of said sheets on a line parallel with said edges, means for applying a gob-like line of adhesive to the outer side of the sheet on which the fold occurs on a line parallel to its edge and spaced inwardly from said fold, means for again folding said marginal portions to make a double fold extending over said line of adhesive, and means for pressing said double fold upon said line of adhesive by pressure applied at opposite sides of said line of adhesive.

7. The method of securing the marginal portions of two sheet portions of crinkled paper together which comprises applying a gob-like line of adhesive to the marginal portion of one of the sheets on a line parallel with its edges, arranging the marginal portions of the two sheets together in superposed relation with the line of adhesive between them, applying pressure to said marginal portions at opposite sides of said line of adhesive so as to cause the adhesive to be squeezed into the spaces between the portions of the crinkles that extend between the lines of pressure while preventing it from spreading beyond said lines, and after the adhesive has become partially dried so that it is in a non-flowing but soft and tacky condition, applying pressure to the seam over said line of adhesive.

8. A bag lining made of crinkled paper with the crinkles extending generally transversely thereof and with at least one of the longitudinal edges of its walls closed by a seam comprising marginal portions of the two walls secured together by a line of adhesive parallel with the longitudinal edges, said lining having longitudinally extending means to provide for circumferential stretchability.

FRANCIS T. ROBINSON.

CERTIFICATE OF CORRECTION.

Patent No. 2,121,053.   June 21, 1938.

FRANCIS T. ROBINSON.

It is hereby certified that error appears in the printed specification of the above numbered patent requiring correction as follows: Page 1, second column, line 51, for the word "upper" read under; and that the said Letters Patent should be read with this correction therein that the same may conform to the record of the case in the Patent Office.

Signed and sealed this 26th day of July, A.D. 1938.

(Seal)

Henry Van Arsdale,
Acting Commissioner of Patents.

CERTIFICATE OF CORRECTION.

Patent No. 2,121,053. June 21, 1938.

FRANCIS T. ROBINSON.

It is hereby certified that error appears in the printed specification of the above numbered patent requiring correction as follows: Page 1, second column, line 51, for the word "upper" read under; and that the said Letters Patent should be read with this correction therein that the same may conform to the record of the case in the Patent Office.

Signed and sealed this 26th day of July, A.D. 1938.

(Seal,

Henry Van Arsdale,
Acting Commissioner of Patents.